United States Patent
Long et al.

(10) Patent No.: US 10,282,637 B2
(45) Date of Patent: May 7, 2019

(54) METHOD, DEVICE, AND STORAGE MEDIUM FOR IMAGE CHARACTERISTIC EXTRACTION

(71) Applicant: Xiaomi Inc., Beijing (CN)

(72) Inventors: Fei Long, Beijing (CN); Zhijun Chen, Beijing (CN); Tao Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/359,091

(22) Filed: Nov. 22, 2016

(65) Prior Publication Data

US 2017/0147899 A1   May 25, 2017

(30) Foreign Application Priority Data

Nov. 25, 2015   (CN) .......................... 2015 1 0827753

(51) Int. Cl.
G06K 9/46   (2006.01)
G06K 9/48   (2006.01)
G06K 9/62   (2006.01)

(52) U.S. Cl.
CPC ......... G06K 9/6249 (2013.01); G06K 9/4647 (2013.01); G06K 2009/4695 (2013.01); G06K 2009/485 (2013.01)

(58) Field of Classification Search
CPC ........................... G06K 9/4671; G06K 9/4647
USPC ........................................................ 382/170
See application file for complete search history.

(56) References Cited

U.S. PATENT DOCUMENTS

| | | | |
|---|---|---|---|
| 8,457,414 B2 | 6/2013 | Jahanbin et al. | |
| 9,524,420 B2 | 12/2016 | Suh et al. | |
| 2009/0034791 A1* | 2/2009 | Doretto | G06K 9/4614 |
| | | | 382/103 |
| 2009/0222226 A1 | 9/2009 | Baraniuk et al. | |
| 2009/0285459 A1 | 11/2009 | Aggarwal et al. | |
| 2011/0090394 A1* | 4/2011 | Tian | H04N 19/63 |
| | | | 348/424.1 |
| 2011/0142335 A1* | 6/2011 | Ghanem | G06F 17/3025 |
| | | | 382/165 |
| 2012/0219213 A1 | 8/2012 | Wang et al. | |
| 2014/0068740 A1 | 3/2014 | LeCun et al. | |
| 2015/0169632 A1 | 6/2015 | Tsai et al. | |

(Continued)

FOREIGN PATENT DOCUMENTS

| | | |
|---|---|---|
| CN | 103761537 A | 4/2014 |
| CN | 104239872 | 12/2014 |

(Continued)

OTHER PUBLICATIONS

Office Action for Korean Application No. 10-2016-7005594, mailed from the Korean Intellectual Office dated Nov. 18, 2016.

(Continued)

*Primary Examiner* — Justin P. Misleh

(74) *Attorney, Agent, or Firm* — Finnegan, Henderson, Farabow, Garrett & Dunner LLP

(57) ABSTRACT

A method for characteristic extraction includes dividing an image into a plurality of blocks, each block including a plurality of cells. The method also includes performing sparse signal decomposition for each cell to obtain a sparse vector corresponding to each cell. The method further includes extracting characteristics of Histogram of Oriented Gradient (HOG) of the image according to the sparse vectors.

16 Claims, 12 Drawing Sheets

(56) References Cited

U.S. PATENT DOCUMENTS

| | | | |
|---|---|---|---|
| 2015/0205998 | A1 | 7/2015 | Suh et al. |
| 2016/0371530 | A1* | 12/2016 | Kwon .................. G06K 9/3241 |
| 2016/0378716 | A1* | 12/2016 | Grochowski ....... G06F 15/8076 |
| | | | 712/2 |

FOREIGN PATENT DOCUMENTS

| | | |
|---|---|---|
| CN | 104657717 | 5/2015 |
| CN | 104850852 A | 8/2015 |
| CN | 105654094 | 6/2016 |
| JP | 07-057077 A | 3/1995 |
| JP | 2011-521355 A | 7/2011 |
| JP | 2013130573 A | 7/2013 |
| JP | 2014-016710 A | 1/2014 |
| JP | 2015-125662 A | 7/2015 |
| KR | 10-2015-0079583 A | 7/2015 |
| KR | 10-2015-0087959 A | 7/2015 |
| RU | 2542946 C2 | 2/2015 |
| WO | WO 2015/011470 | 1/2015 |

OTHER PUBLICATIONS

Office Action for Russian Application No. 2016110719/08(016903), mailed from the Russian Federal Service for Intellectual Property dated May 16, 2017.

Extended European Search Report of European Patent Application No. 16199678.0, from the European Patent Office, dated Apr. 18, 2017.

Narges Ghaedi Bardeh et al., "New Approach for Human Detection in Images Using Histograms of Oriented Gradients," pp. 1-4, dated May 14, 2013, 2013 21st Iranian Conference on Electrical Engineering (ICEE), IEEE, XP032483163, DOI: 10.1109/IRANIANCEE.2013.6599619.

Navneet Dalal et al., "Histograms of Oriented Gradients for Human Detection," pp. 886-893, dated Jun. 25, 2005, Proceedings / 2005 IEEE Computer Society Conference on Computer Vision and Pattern Recognition, CVPR 2005: [Jun. 20-25, 2005, San Diego, CA], IEEE, Piscataway, NJ, USA, vol. 1, XP031330347, ISBN: 978-0-7695-2372-9.

Weilong Yang et al., "Kernel Latent SVM for Visual Recognition," dated Sep. 12, 2012, retrieved on May 15, 2017, at URL: https://www.cs.sfu.ca/~mori/research/papers/yang-nips12.pdf.

International Search Report issued in PCT International application No. PCT/CN2015/099312, dated Jul. 26, 2016 (13 pages).

Notice of Grant of a Patent issued in Korean Patent Application No. 10-2016-7005594, dated Jun. 23, 2017.

Kobayashi, T. et al., "Feature Selection for Object Recognition by Histograms of Oriented Gradients," The Institute of Electronics, Information and Communication Engineers, IEICE Technical Report, dated Mar. 9, 2007, vol. 106, No. 606, pp. 119-124.

Takemura, K et al., "Pedestrian Detection in Top View Depth Images by Using Statistical Shape Modelings," Information Processing Society of Japan and The Institute of Electronics, Information and Communication Engineers, dated Aug. 20, 2013, pp. 125-128.

Chunhui et al., *Research advance on anomaly detection for hyperspectral imagery*, Journal of Electronic Measurement and Instrumentation, vol. 28, No. 8, pp. 803-811, Aug. 2014.

Kato et al., *Multi-frame super-resolution using a sparse coding*, IPSJ, SIG Technical Report, vol. 2013-CVIM-187, No. 3, 9 pgs., May 30, 2013.

Hino et al., *Math of sparse expression and its application*, IPSJ, SIG Technical Report, vol. 2012-CVIM-183, No. 20, 10 pgs., Sep. 3, 2012.

* cited by examiner

METHOD, DEVICE, AND STORAGE MEDIUM FOR IMAGE CHARACTERISTIC EXTRACTION

CROSS-REFERENCE TO RELATED APPLICATION

This application is based upon and claims priority to Chinese Patent Application No. 201510827753.4, filed Nov. 25, 2015, the entire contents of which are incorporated herein by reference.

TECHNICAL FIELD

The present disclosure generally relates to image processing and more particularly, to methods, devices, and storage media for image characteristic extraction.

BACKGROUND

Image detection and recognition is an important research field in computer vision. The most common technology in image detection and recognition detects and recognizes an image by extracting features or characteristics from the image.

In the related art, an image is detected and recognized by obtaining (e.g., extracting) the Histogram of Oriented Gradient (HOG) characteristics (or features) of the image. The method to extract the characteristics of HOG is described as follows: computing the gradient of each pixel in an image; dividing the image into a plurality of cells, each cell including a plurality of pixels, and every neighboring n cells forming a block; calculating the Histogram of Gradient of all of the pixels in each cell, and extracting the characteristics of HOG of respective blocks according to the Histogram of Gradient of all of the cells in the block; and extracting the characteristics of HOG of the image according to the statistics of the characteristics of HOG of all the blocks in the image.

SUMMARY

In view of the fact in related arts, a method, device and storage medium for characteristic extraction are disclosed in the disclosure.

According to a first aspect of the present disclosure, a method for characteristic extraction is provided. The method includes dividing an image into a plurality of blocks, each block including a plurality of cells. The method also includes performing sparse signal decomposition for each cell to obtain a sparse vector corresponding to each cell. The method further includes extracting characteristics of Histogram of Oriented Gradient (HOG) of the image according to the sparse vectors.

According to a second aspect of the present disclosure, a device for characteristic extraction is provided. The device includes a processor and a memory configured to store instructions executable by the processor. The processor is configured to divide an image into a plurality of blocks, each block including a plurality of cells. The processor is also configured to perform sparse signal decomposition for each cell to obtain a sparse vector corresponding to each cell. The processor is further configured to extract characteristics of Histogram of Oriented Gradient (HOG) of the image according to the sparse vectors.

According to a third aspect of the disclosure, a non-transitory computer-readable storage medium is provided. The non-transitory computer-readable storage medium has instructions stored therein that, when executed by a processor of a computer device, cause the computer device to perform a method for characteristic extraction. The method includes dividing an image into a plurality of blocks, each block including a plurality of cells. The method also includes performing sparse signal decomposition for each cell to obtain a sparse vector corresponding to each cell. The method further includes extracting characteristics of Histogram of Oriented Gradient (HOG) of the image according to the sparse vectors.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the invention. Instead, they are merely examples of devices and methods consistent with aspects related to the invention as recited in the appended claims.

The technical solutions provided in the embodiments of the present disclosure have the following beneficial effects. The disclosed technical solutions include dividing an image into a plurality of blocks, each block including a plurality of cells, and performing sparse signal decomposition for each cell to obtain a sparse vector corresponding to each cell. The disclosed technical solutions also include extracting characteristics of Histogram of Oriented Gradient (HOG) of the image according to the sparse vectors. The disclosed technical solutions solve the problem of low detection ratio and accuracy in pattern recognition in the related art, which can be caused by extracting the characteristics of HOG directly from the space domain of the image. By extracting the characteristics of HOG in the frequency domain, the disclosed technical solutions increase the detection ratio and accuracy in pattern recognition.

It is to be understood that both the foregoing general description and the following detailed description are exemplary only and are not restrictive of the disclosure.

Figure 1:
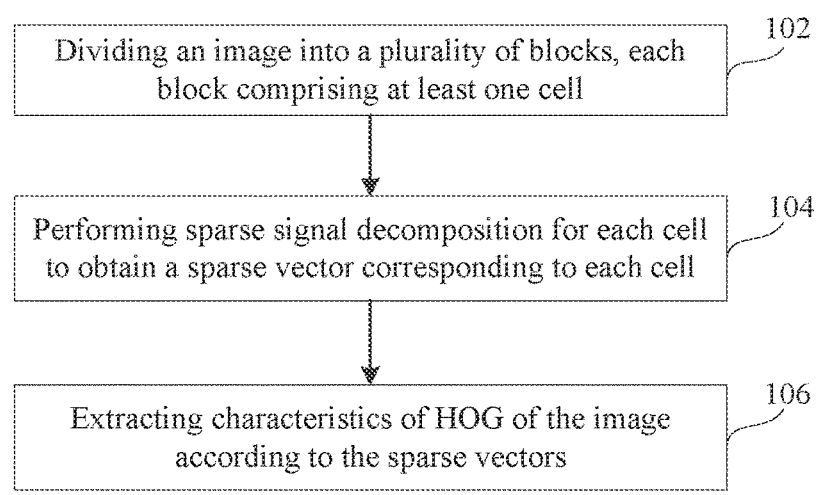
FIG. 1 is a flowchart showing a method for characteristic extraction according to an exemplary embodiment.

FIG. 1 is a flowchart showing a method for characteristic extraction according to an exemplary embodiment. The disclosed method can be implemented using hardware disclosed herein for pattern recognition. The method includes the following steps.

In step 102, an image is divided into a plurality of blocks, each block including at least one cell (e.g., a plurality of cells).

In step 104, sparse signal decomposition is performed for each cell to obtain a sparse vector corresponding to each cell.

The sparse signal decomposition is a process of transforming an observed signal to a sparse vector according to rules of decomposition, the sparse vector having at least one element (e.g., a plurality of elements) that is zero. In the disclosed embodiments, the pixels of each cell serve as the observed signal for obtaining the sparse vector for each cell.

In step 106, the characteristics of Histogram of Oriented Gradient (HOG) of the image are extracted according to the sparse vectors.

A terminal extracts the characteristics of HOG of an image according to the sparse vectors obtained through the sparse signal decomposition.

In summary, the disclosed method includes dividing an image into a plurality of blocks, each block including at least one cell (e.g., a plurality of cells), performing sparse signal decomposition for each cell to obtain a sparse vector corresponding to each cell, and extracting the characteristics of Histogram of Oriented Gradient (HOG) of the image according to the sparse vectors. The disclosed methods solve the problem of low detection ratio and accuracy in pattern recognition in related art that is caused by extracting the characteristics of HOG directly from the space domain of the image. By extracting the characteristics of HOG in the frequency domain, the disclosed methods increase the detection ratio and accuracy in pattern recognition.

Figure 2A:
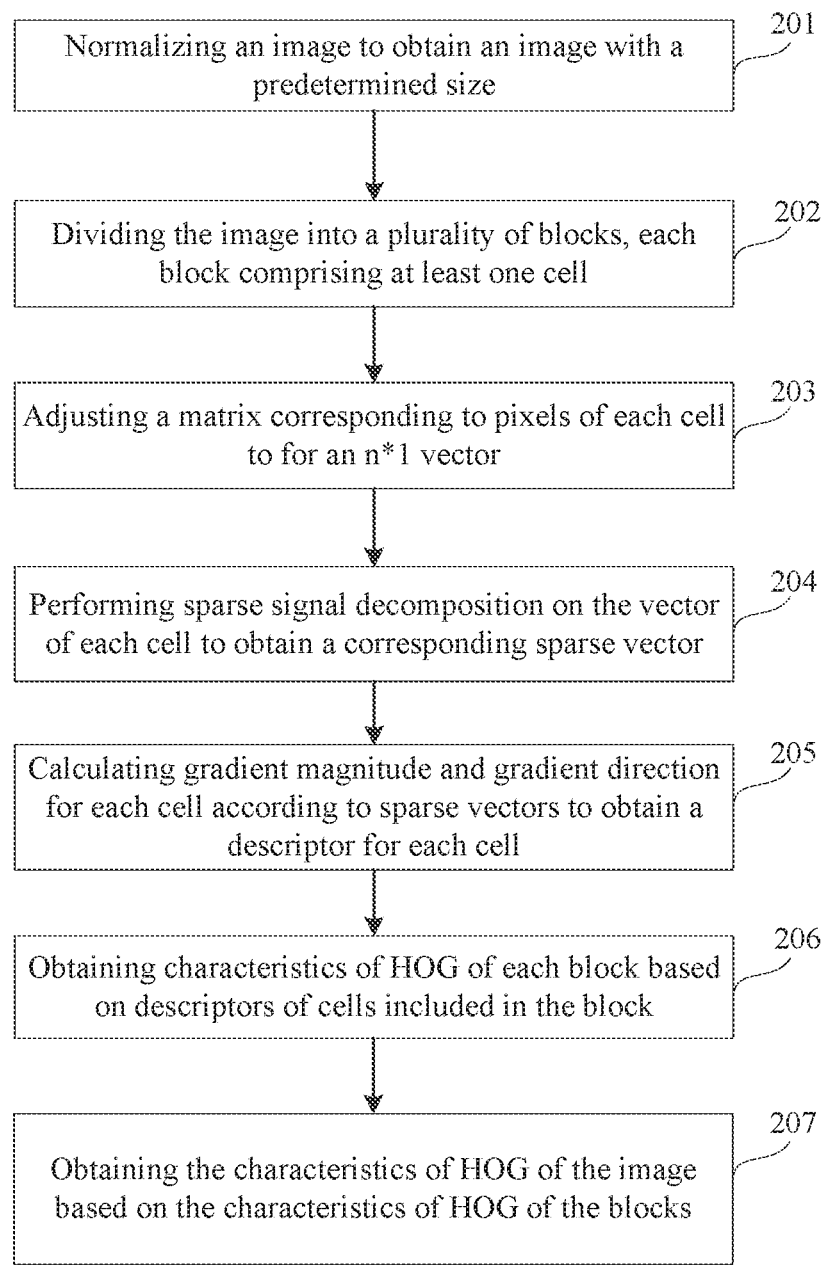
FIG. 2A is a flowchart showing a method for characteristic extraction according to another exemplary embodiment.

FIG. 2A is a flowchart showing a method for characteristic extraction according to another exemplary embodiment. The disclosed method may be implemented using hardware disclosed herein for pattern recognition. The method includes the following steps.

In step 201, an image is normalized to obtain an image with a predetermined size.

Pattern recognition generally involves extracting image characteristics from a plurality of images. Before extracting characteristics from a plurality of images, a terminal normalizes the plurality of images such that the images with different sizes are transformed into images having a predetermined size, thereby enabling uniform processing of the images.

In step 202, the image is divided into a plurality of blocks, each block including at least one cell (e.g., a plurality of cells).

Optionally, dividing a normalized image may include dividing the normalized image into a plurality of blocks, and then dividing each block into a plurality of cells.

Optionally, dividing a normalized image may include dividing the normalized image into a plurality of cells, and then forming blocks by neighboring cells, each block including a plurality of neighboring cells. For example, a block may include four pairwise adjacent cells shaped like a 2*2 table (i.e., a 2 by 2 table, where * used hereinafter represents the multiplication operator).

In the process of dividing an image, the order of forming blocks and forming cells is not specifically limited. In some embodiments, the blocks may be formed by dividing the image before cells are formed by dividing the blocks. In some embodiments, the image is first divided into cells, and then the blocks are formed using the neighboring cells.

The disclosed embodiments do not specifically limit whether there is an overlap between the divided blocks of the image. There may be an overlap or there may not be an overlap between the blocks.

Figure 2B:
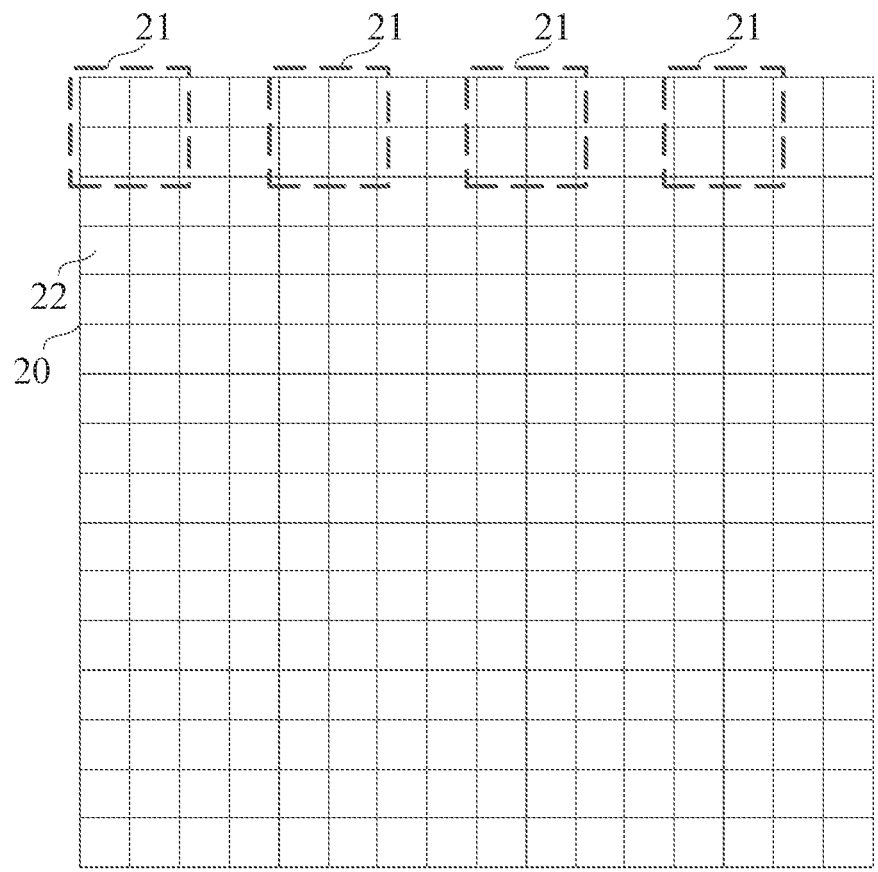
FIG. 2B is a diagram showing a method for dividing an image according to an exemplary embodiment.

FIG. 2B is a diagram showing a method for dividing an image according to an exemplary embodiment. As shown in FIG. 2B, for an image 20 having a size of 128 pixels*128 pixels, the image 20 may first be divided into a plurality of blocks 21, each block having a size of 16 pixels*16 pixels. The blocks 21 do not overlap each other. Then each block 21 having the size of 16 pixels*16 pixels is divided into a plurality of cells 22, each cell having a size of 8 pixels*8 pixels. Thus, the image includes 8*8=64 blocks 21 that do not overlap each other, and each block 21 includes 2*2=4 cells 22.

Figure 2C:
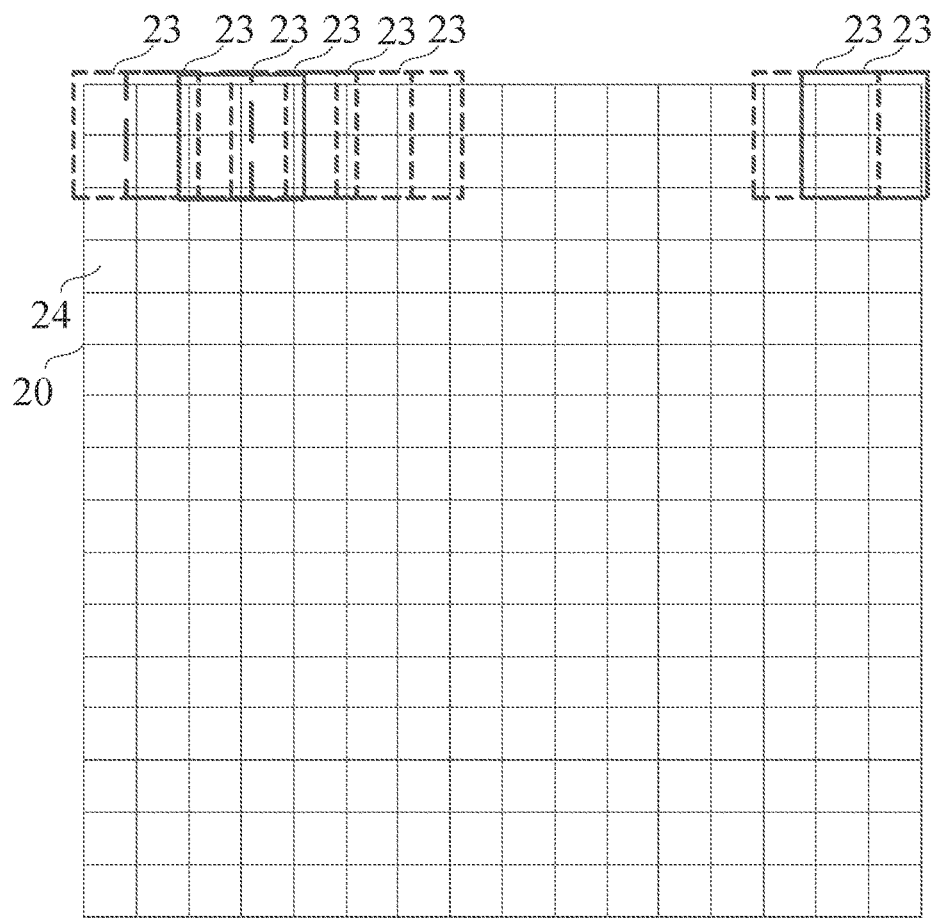
FIG. 2C is a diagram showing a method for dividing an image according to another exemplary embodiment.

FIG. 2C is a diagram showing a method for dividing an image according to another exemplary embodiment. As shown in FIG. 2C, for an image having a size of 128 pixels*128 pixels, it may first be divided into a plurality of blocks 23, each block having a size of 16 pixels*16 pixels. The blocks 23 overlap each other. Then each block 23 having a size of 16 pixels*16 pixels is divided into a plurality of cells 24, each cell having a size of 8 pixels*8 pixels. Thus, the image includes 16*16=256 blocks 23 that overlap each other, and each block 23 includes 2*2=4 cells.

Referring back to FIG. 2A, in step 203, the pixels of each cell are adjusted to form an n*1 dimensional vector.

After the image is divided, the pixels of each cell may be considered as a matrix, and the matrix corresponding to the pixels of each cell is adjusted to form an n*1 dimensional vector.

Figure 2D:
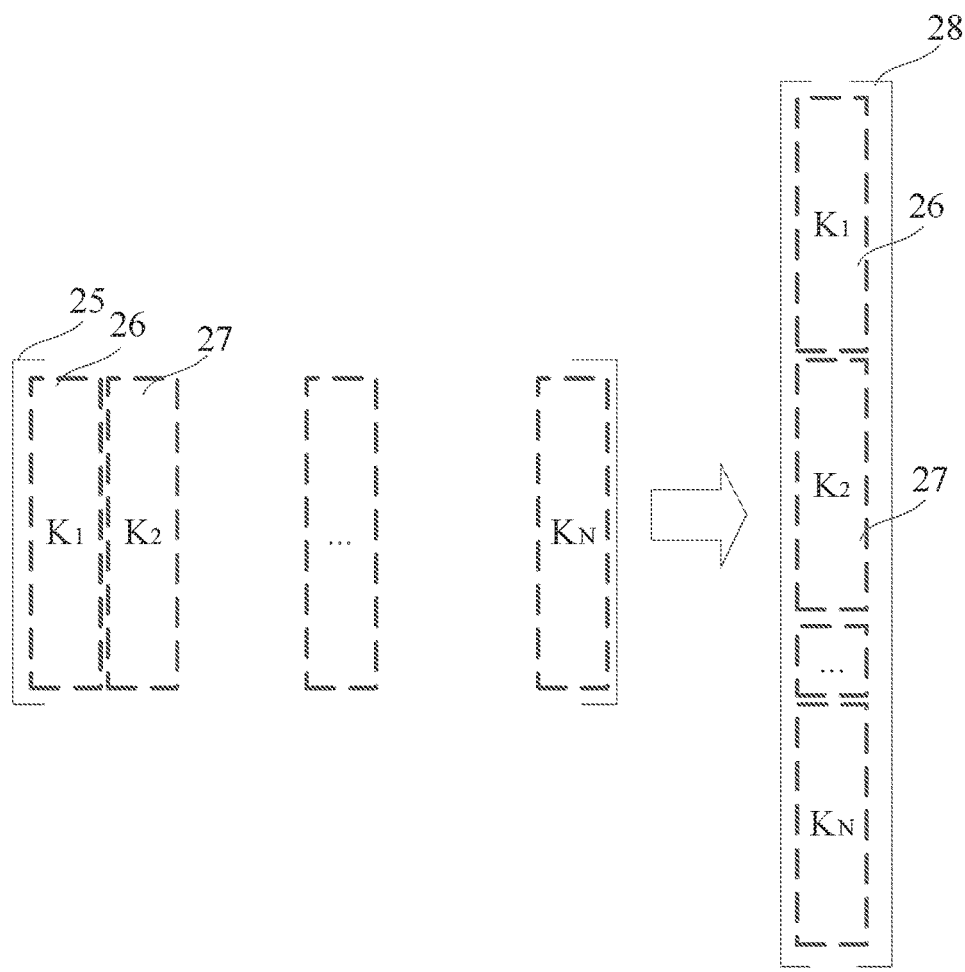
FIG. 2D is a diagram showing a method for adjusting pixels of a cell according to an exemplary embodiment.

FIG. 2D is a diagram showing a method for adjusting pixels of a cell according to an exemplary embodiment. As shown in FIG. 2D, in the process of adjusting a matrix 25 corresponding to the pixels, a second column $K_2$ (reference number 27) in the matrix 25 is cascaded under a first column $K_1$ (reference number 26) in the matrix 25, and the third column (not shown in FIG. 2D) in the matrix 25 is cascaded under the second column $K_2$ (27), and so on. The matrix 25 having N columns ($K_1$, $K_2$, . . . , $K_N$) is transformed into a vector 28 having a single column That is, the matrix 25 corresponding to the pixels of each cell is adjusted to form an n*1 dimensional vector 28, as shown in FIG. 2D.

Referring back to FIG. 2A, in step 204, sparse signal decomposition is performed on the vector of each cell (e.g., vector 28) using the following formula (1) to obtain a corresponding sparse vector:

$$\min(x)\|x\|_1 \text{ subject to } y=Dx \qquad (1)$$

Here, y is the vector of each cell, D is a predefined over-inclusive dictionary, x is the sparse vector obtained by performing sparse signal decomposition on y using the over-inclusive dictionary D, and $\|x\|_1$ is the summation of the absolute values of all rows in each column of the sparse vector x, wherein each sparse vector is an m*1 dimensional vector, and the over-inclusive dictionary D is an n*m matrix.

For each cell of an image, the terminal predefines the over-inclusive dictionary D. The vector of each cell is used as y. The sparse vector x is calculated for the vector 28 of each cell using formula (1) and the predefined over-inclusive dictionary D. Because the vector of each cell obtained after adjusting the matrix has n*1 dimensions, and the over-inclusive dictionary D predefined by the terminal is an n*m matrix, the sparse vector calculated using formula (1) corresponding to the vector of each cell has m*1 dimensions.

Referring back to FIG. 2A, in step 205, a gradient magnitude and a gradient direction are calculated for each cell according to sparse vectors to obtain a descriptor for each cell.

Horizontal gradient and vertical gradient are calculated using a gradient operator for each pixel of each cell after the vector for each cell has been processed with sparse signal decomposition. That is, for each element of the sparse vector corresponding to each cell, the horizontal gradient and the vertical gradient are calculated using the gradient operator.

The commonly used gradient operators are shown in the following table:

TABLE 1

| Mask type | Central vector | Non-central vector | Correction vector | Diagonal | Sobel operator |
|---|---|---|---|---|---|
| operator | [1 0 −1] | [1 −1] | [1 8 0 −8 −1] | $\begin{pmatrix} 0 & 1 \\ -1 & 0 \end{pmatrix} \begin{pmatrix} 1 & 0 \\ 0 & -1 \end{pmatrix}$ | $\begin{pmatrix} 1 & 0 & -1 \\ 2 & 0 & -2 \\ 1 & 0 & 1 \end{pmatrix}$ |

In the disclosed embodiments, when a gradient of a pixel of each cell is calculated, any gradient operator included in Table 1 may be used. Other gradient operators not listed in Table 1 may also be used. The choice of the gradient operator is not limited.

Assuming that the horizontal gradient of an element in a sparse vector is H(x, y), and the vertical gradient is V(x, y), the gradient direction and gradient magnitude corresponding to the element of the sparse vector can be calculated using the following formulas (2) and (3):

$$\theta(x,y)=\tan^{-1}[V(x,y)/H(x,y)] \quad (2)$$

$$m(x,y)=[H(x,y)^2+V(x,y)^2]^{1/2} \quad (3)$$

Here, θ(x,y) is the gradient direction of element (x, y) in the sparse vector, and m(x, y) is the gradient magnitude of the element (x, y).

The gradient direction θ(x,y) ranges between −90 degrees to 90 degrees. In the disclosed embodiments, the gradient direction θ(x,y) may be evenly divided into z portions. For each of the z portions in the gradient direction, statistical calculations are performed for all elements in the sparse vector corresponding to each cell using m (x, y) as a weight. A z-dimensional vector is obtained for each cell, which is a descriptor corresponding to each cell.

For example, the gradient direction θ(x,y) is divided into 9 portions, each portion corresponding to an angle of 20 degrees. For all elements in the sparse vector corresponding to each cell, statistical calculations are performed using the weight m (x, y) in each 20-degree angle. As a result, a 9-dimensional vector is obtained for each cell.

The disclosed embodiments do not limit the number of portions the gradient direction is divided into.

Referring back to FIG. 2A, in step 206, statistical calculations are performed on each descriptor (and all descriptors) of each cell (and all cells) for each block to obtain the characteristics of HOG of the corresponding block.

The terminal performs the statistical calculations on the descriptor of each cell (and descriptors of all cells) included in each block to obtain the characteristics of HOG for each block.

When performing the statistical calculations on the descriptors of cells, the terminal may cascade the descriptors corresponding to all cells so that the characteristics of HOG of each block are represented by a vector, whose dimension is k times the dimension of the descriptors corresponding to the cells included in the block.

For example, the descriptor for each cell is a 9-dimensional vector, and each block includes 4 cells. So the 9-dimensional descriptors in 4 cells are cascaded to form a 36-dimensional vector, which is used to represent the characteristics of HOG for the corresponding block.

In step 207, statistical calculations are performed on the characteristics of HOG of each block (and all blocks) to obtain the characteristics of HOG of the image.

The terminal performs the statistical calculations on the characteristics of HOG of the blocks included in the image to obtain the characteristics of HOG of the image. The terminal cascades the characteristics of HOG of the blocks to form a matrix to obtain the characteristics of HOG of the image. Each column of the matrix represents the characteristics of HOG of a block.

Figure 2E:
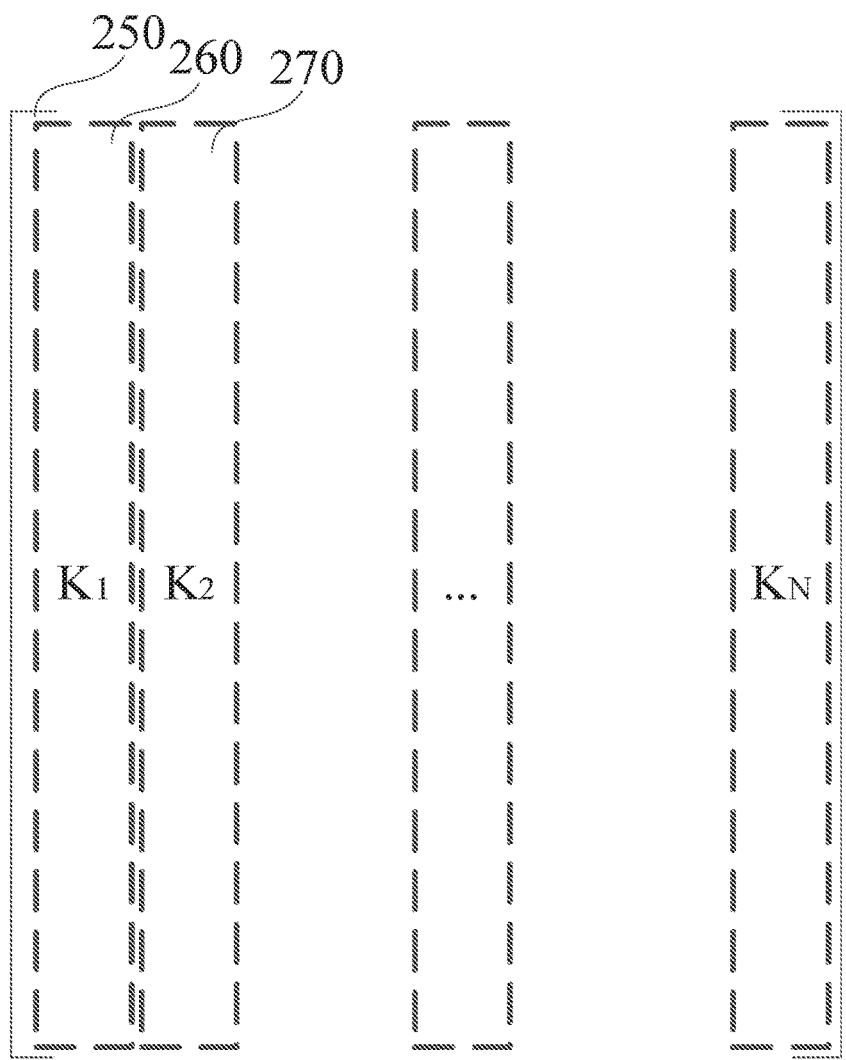
FIG. 2E is a diagram showing a method for obtaining characteristics of HOG of an image according to an exemplary embodiment.

FIG. 2E is a diagram showing a method for obtaining characteristics of HOG of an image from the characteristics of HOG of blocks. For example, the image includes N blocks, and the characteristics of HOG of each block are represented by a vector $K_i$, i=1, 2, . . . , N. The characteristics of HOGs (represented by $K_1, K_2, \ldots, K_N$) are cascaded to form a matrix 250, as shown in FIG. 2E. For example, $K_1$ is placed at the first column 260 of the cascaded matrix 250, and $K_2$ placed at the second column 270 of the cascaded matrix 250, and so forth.

In summary, in the disclosed methods for characteristic extraction, an image is divided into a plurality of blocks, each block including a plurality of cells. The pixels of each cell (e.g., a matrix corresponding to the pixels) are adjusted to form an n*1 dimensional vector. Sparse signal decomposition is performed for each cell to obtain a sparse vector using formula (1) corresponding to each cell. The gradient magnitude and gradient direction of each cell are calculated using formulas (2) and (3) based on the sparse vector to obtain a descriptor of each cell. Statistical calculations are performed on each descriptor of each cell to obtain the characteristics of HOG of respective block. Statistical calculations are performed on the characteristics of HOG of each block to obtain the characteristics of HOG of the image. The disclosed methods solve the problem of low detection ratio and accuracy in pattern recognition in related art that is caused by extracting the characteristics of HOG directly from the space domain of the image. By extracting the characteristics of HOG in the frequency domain, the disclosed methods increase the detection ratio and accuracy in pattern recognition.

In the method shown in FIG. 2A, when performing statistical calculations on the characteristics of HOG of each block of the image to obtain the characteristics of HOG of the image, the vector representing the characteristics of HOG of the blocks may be arranged according to the corresponding positions of the blocks in the image. Step 207 in FIG. 2A may be replaced by steps 207*a* and 207*b*, as shown in FIG. 3A.

Figure 3A:
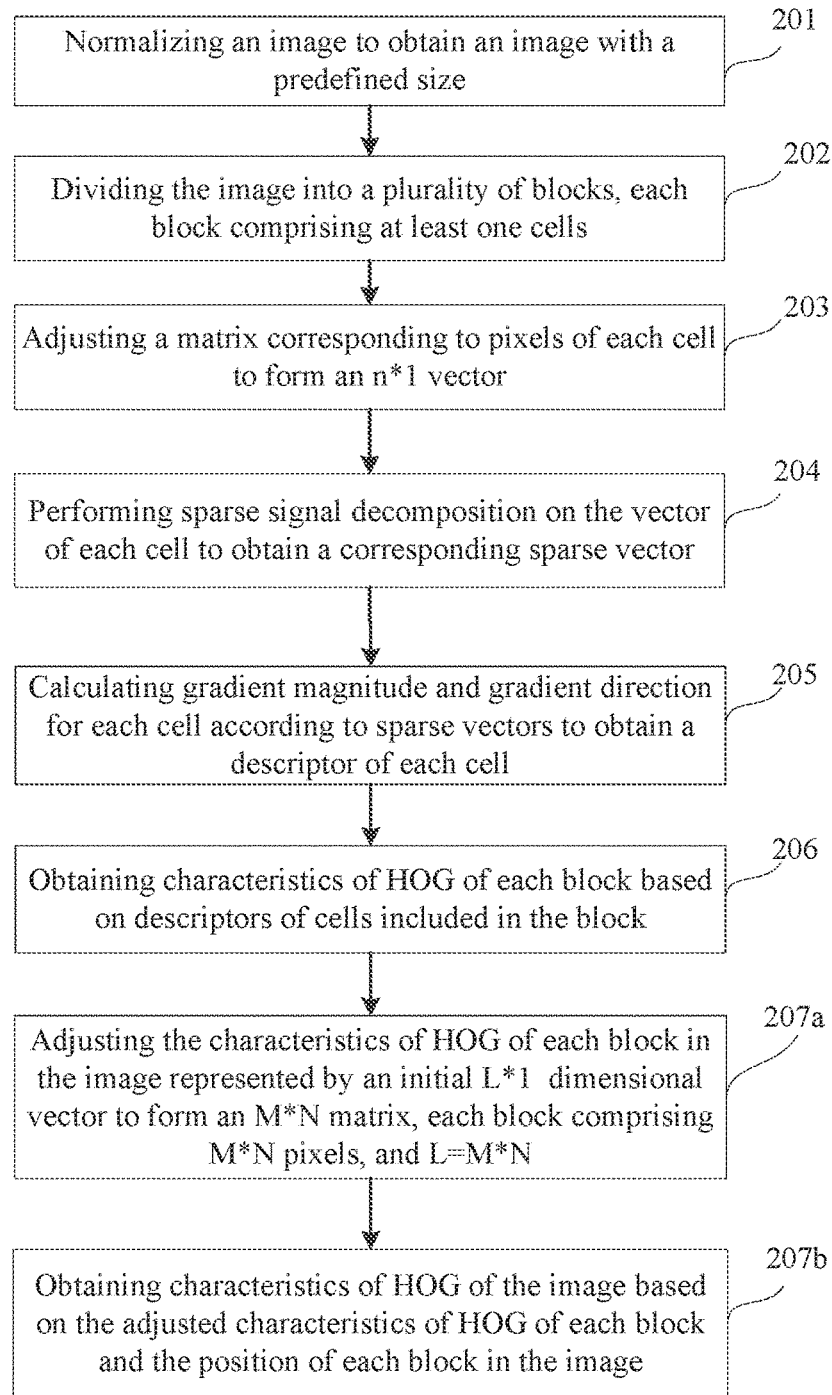
FIG. 3A is a flowchart showing a method for characteristic extraction according to an exemplary embodiment.

FIG. 3A is a flowchart showing a method for characteristic extraction according to an exemplary embodiment. The method shown in FIG. 3A includes steps 201-206 that are discussed above in connection with FIG. 2A. Therefore, the detailed descriptions of steps 201-206 are not repeated. In step 207*a*, the characteristics of HOG of each block in the image represented by an initial L*1 dimensional vector are adjusted to form an M*N matrix, each block including M*N pixels, and L=M*N.

The characteristics of HOG of each block are represented by an L*1 dimensional vector obtained by cascading descriptors of the cells included in the block. The L*1 dimensional vector is adjusted to form an M*N matrix. That is, the L*1 dimensional vector of each block is adjusted to form a corresponding matrix according to the cells included in the block. Each column of the corresponding matrix is the descriptor of a cell. Then the descriptor of each cell is adjusted according to the corresponding pixels. Each column of the adjusted matrix represents the characteristics of HOG of the pixels included in a corresponding column of a corresponding block.

In step 207*b*, the characteristics of HOG of the image are obtained (e.g., extracted) according to the adjusted characteristics of HOG of each block and a corresponding position of each block in the image.

Based on the adjusted characteristics of HOG of each block and the corresponding position of each block in the image, the characteristics of HOG of the pixel located at the corresponding position in the image can be extracted.

Figure 3B:
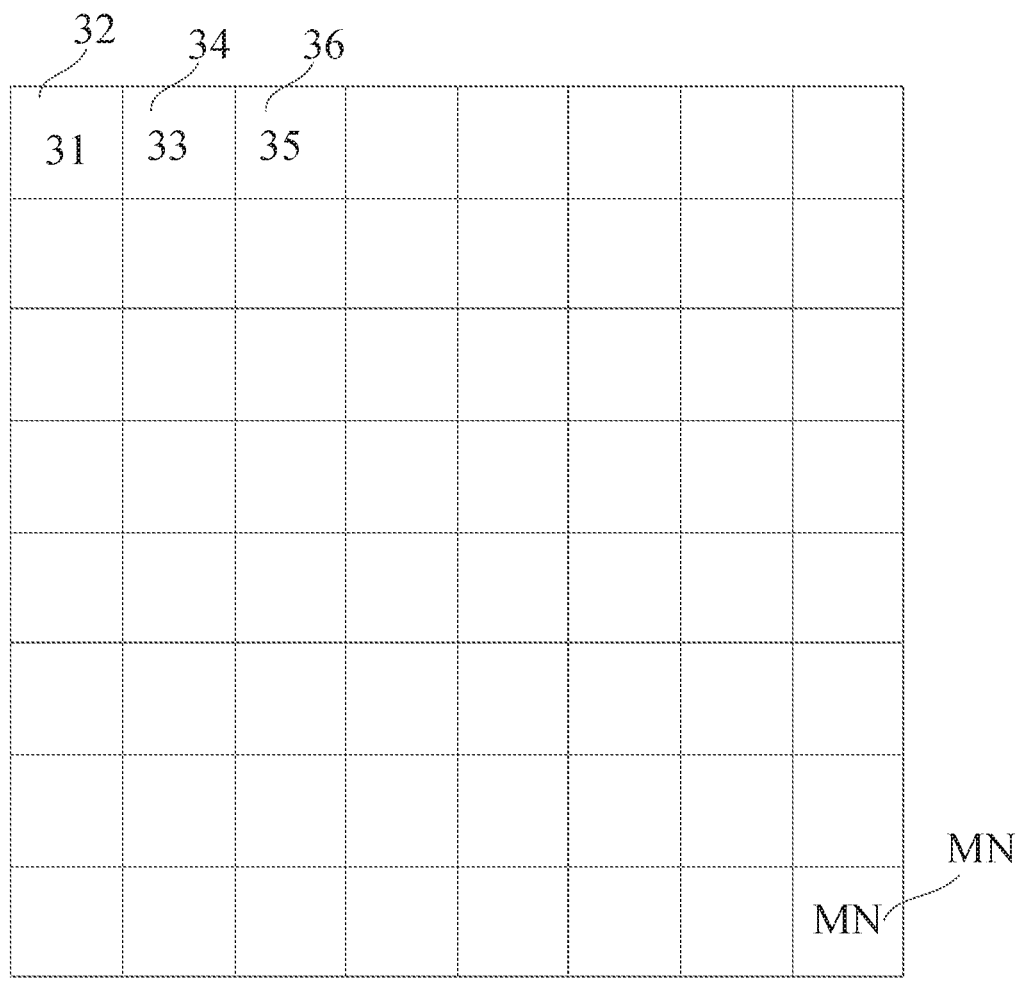
FIG. 3B is a diagram showing a method for obtaining characteristics of HOG of an image according to an exemplary embodiment.

FIG. 3B is a diagram showing a method for obtaining characteristics of HOG of an image according to an exemplary embodiment. In the example shown in FIG. 3B, the image includes N blocks, and characteristics of HOG of each block are represented by a vector $K_i$, i=1, 2, . . . , N. Each $K_i$ is adjusted to form an M*N matrix. Matrix 31 obtained from adjusting $K_1$ is placed at a position corresponding to the position of the first block 32 in the image, and matrix 33 obtained from adjusting $K_2$ is placed at a position corresponding to the position of the second block 34 in the image, and so forth. The last matrix MN obtained from adjusting $K_N$ is placed at a position corresponding to that of the last block MN in the image, as shown in FIG. 3B.

In summary, in the disclosed methods for characteristics extraction, the characteristics of HOG of each block in the image represented by an initial L*1 dimensional vector are adjusted to form an M*N matrix, each block including M*N pixels, and L=M*N. The characteristics of HOG of the image are extracted according to the adjusted characteristics of HOG of each block and the corresponding position of each block of the image. The extracted characteristics of HOG of the image correspond to the positions of each block in the image, thereby better highlighting the characteristics of each block of the image.

The following are the embodiments of the device of the present disclosure, which may be used to perform the disclosed methods. As to the details not described in discussions of the devices, one can refer to the above discussions of the methods.

Figure 4:
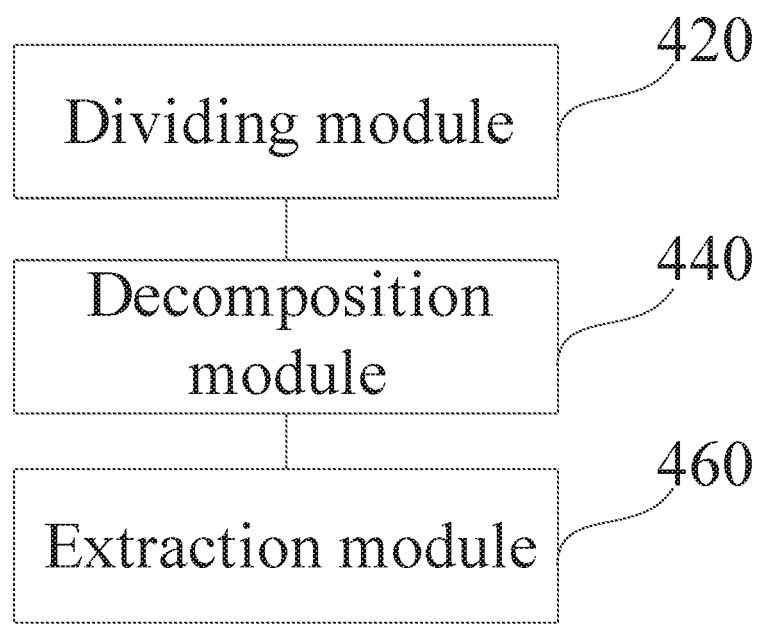
FIG. 4 is a block diagram showing a device for characteristic extraction according to an exemplary embodiment.

FIG. 4 is a block diagram showing a device for characteristic extraction according to an exemplary embodiment. As shown in FIG. 4, the device for characteristic extraction includes, but is not limited to, a dividing module 420 configured to divide the image into a plurality of blocks, each block including at least one cell (e.g., a plurality of cells), and a decomposition module 440 configured to perform sparse signal decomposition for each cell to obtain a sparse vector corresponding to each cell.

The sparse signal decomposition is performed to transform an observed signal into a sparse vector according to decomposition rules. At least one element (e.g., a plurality of elements) in the sparse vector is zero. In the disclosed embodiments, the pixels of each cell serve as the observed signal for extracting the respective sparse vector of each cell.

The device also includes an extraction module 460 configured to extract characteristics of Histogram of Oriented Gradient (HOG) of the image according to the sparse vectors.

In summary, the disclosed device for characteristic extraction divides the image into a plurality of blocks, each block including at least one cell (e.g., a plurality of cells). The device performs sparse signal decomposition for each cell to obtain a sparse vector corresponding to each cell. The device extracts the characteristics of Histogram of Oriented Gradient (HOG) of the image according to the sparse vectors. The disclosed device solves the problem of low detection ratio and accuracy in pattern recognition in the related art that is caused by extracting the characteristics of HOG directly from the space domain of the image. By extracting the characteristics of HOG in the frequency domain, the disclosed device increases the detection ratio and accuracy in pattern recognition.

Figure 5:
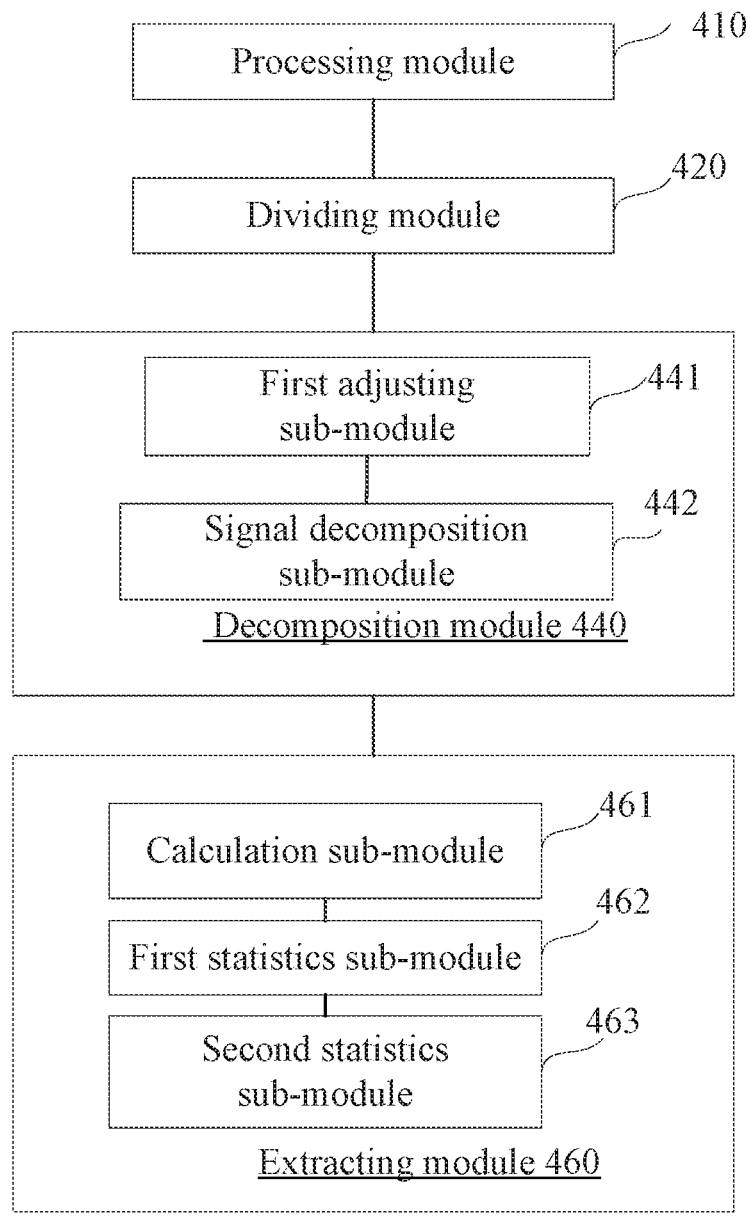
FIG. 5 is a block diagram showing a device for characteristic extraction according to another exemplary embodiment.

FIG. 5 is a block diagram showing a device for characteristic extraction according to another exemplary embodiment. As shown in FIG. 5, the device for characteristic extraction includes, but is not limited to, a processing module 410 configured to normalize an image to obtain an image with a predefined size.

Pattern recognition generally involves extracting characteristics from a plurality of images. Before extracting characteristic from the images, processing module 410 normalizes the images so that images having different sizes are transformed into images having a predefined size, thereby enabling uniform processing of the images.

The device shown in FIG. 5 also includes the above-described dividing module 420 configured to divide the image into a plurality of blocks, each block including at least one cell (e.g., a plurality of cells).

Optionally, dividing the normalized image by the dividing module 420 includes dividing the image into a plurality of blocks, and then dividing each block into a plurality of cells.

Optionally, dividing the normalized image by the dividing module 420 includes dividing the image into a plurality of cells, and then forming a block using the neighboring cells, each block including a plurality of neighboring cells. For example, a block may be formed with four pairwise adjacent cells shaped like a 2*2 table.

In the process of dividing an image, the disclosed embodiments do not limit the order of forming blocks and dividing the blocks or the image to form cells. The blocks may be formed by dividing the image before the cells are formed by dividing the blocks. Alternatively, the cells are formed first by dividing the image, and then the blocks are formed using the neighboring cells.

The disclosed embodiments do not limit whether there is an overlap between the blocks of the image. There may be an overlap or there may not be an overlap between the blocks.

The device shown in FIG. 5 also includes the above-described decomposition module 440 configured to perform sparse signal decomposition for each cell to obtain a sparse vector corresponding to each cell.

The sparse signal decomposition is performed to transform an observed signal into a sparse vector according to the rules of decomposition. At least one element (e.g., a plurality of elements) in the sparse signal is zero.

In the embodiment disclosed in FIG. 5, the decomposition module 440 includes a first adjusting sub-module 441 configured to adjust the pixels in each cell to form an n*1 dimensional vector.

After the image is divided, the pixels in each cell may be considered as a matrix, and the first adjusting sub-module 441 adjusts the matrix corresponding to the pixels in each cell to form an n*1 dimensional vector.

The device shown in FIG. 5 also includes a signal decomposition sub-module 442 configured to perform sparse signal decomposition for the vector of each cell using formula (1) described above.

The device shown in FIG. 5 includes the above-described extracting module 460 configured to extract the characteristics of Histogram of Oriented Gradient (HOG) of the image according to the sparse vectors.

In the embodiment shown in FIG. 5, the extracting module 460 includes a calculation sub-module 461 configured to calculate a gradient magnitude and a gradient direction of each cell according to the sparse vector in order to obtain a descriptor of each cell.

By using a gradient operator, the calculating sub-module 461 calculates horizontal gradient and vertical gradient of each pixel in each cell using the Discrete Cosine Transform (DCT) or Discrete Fourier Transform (DFT). The disclosed embodiments do not limit the choice of gradient operator.

Assuming that the horizontal gradient of the element in sparse vector is $H(x, y)$, and the vertical gradient is $V(x, y)$, the gradient direction and gradient magnitude corresponding to a pixel are calculated using formulas (1) and (2) described above.

The device shown in FIG. 5 also includes a first statistics sub-module 462 configured to perform statistical calculations for a descriptor of a block to obtain the characteristics of HOG of each block. The first statistics sub-module 462 performs statistical calculations for the descriptor of each cell included in each block to obtain the characteristics of HOG of each block. While performing statistical calculations for the descriptor of each cell, the first statistics sub-module 462 cascades the descriptors corresponding to all cells so that the characteristics of HOG of each block are represented by a vector, whose dimension is k times the dimension of the descriptor corresponding to the cells included in the block.

The device shown in FIG. 5 also includes a second statistics sub-module 463 configured to perform statistical calculations of the characteristics of HOG of blocks to obtain the characteristics of HOG of the image. The second statistics sub-module 463 performs statistical calculations of the characteristics of HOG of blocks in the image to obtain the characteristics of HOG of the image.

Optionally, the second statistics sub-module 463 cascades the characteristics of HOG of blocks to form a matrix in order to obtain the characteristics of HOG of the image, wherein each column of the matrix is the characteristics of HOG of a block.

In summary, the disclosed device divides the image into a plurality of blocks, each block including a plurality of cells. The device adjusts the pixels in each cell to form an n*1 dimensional vector. The device performs sparse signal decomposition for each cell using formula (1) to obtain a sparse vector corresponding to each cell. The device calculates the gradient magnitude and gradient direction of each cell using formulas (2) and (3) based on the sparse vector to obtain a descriptor of each cell. The device performs statistical calculations of each descriptor in each cell to obtain the characteristics of HOG of each block. The device also performs statistical calculations of the characteristics of HOG of each cell to obtain the characteristics of HOG of the image. The device solves the problem of low detection ratio and accuracy in pattern recognition in the related art that is caused by extracting the characteristics of HOG directly from the space domain of the image. By extracting the characteristics of HOG in the frequency domain, the disclosed device increases the detection ratio and accuracy in pattern recognition.

Figure 6:
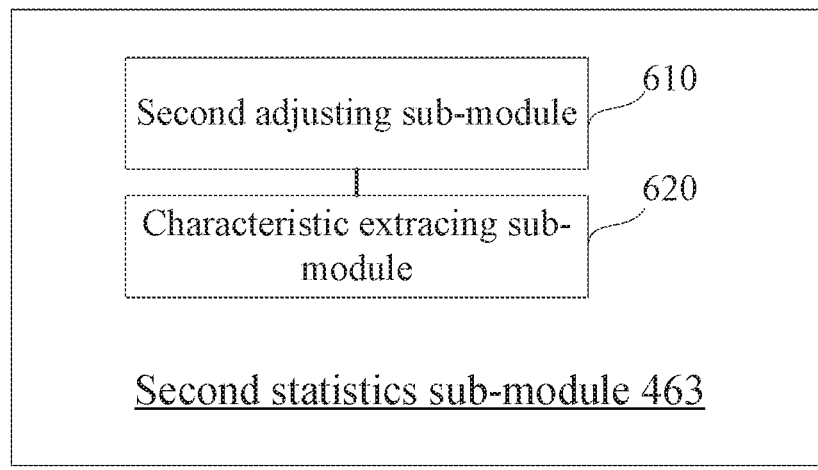
FIG. 6 is a block diagram showing sub-modules of a device for characteristic extraction according to an exemplary embodiment.

Optionally, the second statistics sub-module 463 shown in FIG. 5 includes the following sub-modules shown in FIG. 6. As shown in FIG. 6, the second statistics sub-module 463 includes a second adjusting sub-module 610 configured to adjust the characteristics of HOG of each block in the image represented by an initial L*1 dimensional vector to form an M*N matrix, each block including M*N pixels, and L=M*N.

The characteristics of HOG of each block are represented by an L*1 dimensional vector cascaded by the descriptors corresponding to the cells. The adjusting sub-module 610 adjusts the L*1 dimensional vector to form an M*N matrix. That is, the L*1 dimensional vector for each block is adjusted to form a corresponding matrix according to the cells included in the block, wherein each column of the corresponding matrix is the descriptor of a cell. Then the descriptor of each cell is adjusted according to the corresponding pixels, wherein each column of the adjusted matrix is the characteristics of HOG corresponding to the pixels of the corresponding column in the corresponding block.

The second statistics sub-module 463 includes a characteristic extraction sub-module 620 configured to extract the characteristics of HOG of the image according to the adjusted characteristics of HOG of each block and the corresponding position of each block in the image.

In some embodiments, according to the adjusted characteristics of HOG of each block and the corresponding position of each block in the image, the characteristic extraction sub-module 620 extracts the characteristics of HOG of the pixels located at the corresponding position in the image.

In summary, the disclosed device for characteristic extraction adjusts the characteristics of HOG of each block in the image represented by an initial L*1 dimensional vector to form an M*N matrix, each block including M*N pixels, and L=M*N. The device extracts or obtains the characteristics of HOG of the image according to the adjusted characteristics of HOG of each block and the corresponding position of each block in the image. The extracted characteristics of HOG of the image correspond to the corresponding position of each block in the image, thereby better highlighting the characteristics of each block in the image.

With respect to the disclosed device, the specific manners in which the respective modules perform operations have been described in detail in the discussions of the disclosed methods and are not repeated here.

In an exemplary embodiment of the present disclosure, a device for characteristic extraction is provided. The device implements the disclosed methods for characteristic extraction. The device includes a processor and a memory configured to store processor-executable instructions. The processor is configured to divide an image into a plurality of blocks, each block including at least one cell (e.g., a plurality of cells). The processor is also configured to perform sparse signal decomposition for each cell to obtain a sparse vector corresponding to each cell. The processor is further configured to extract the characteristics of Histogram of Oriented Gradient (HOG) of the image according to the sparse vectors.

Figure 7:
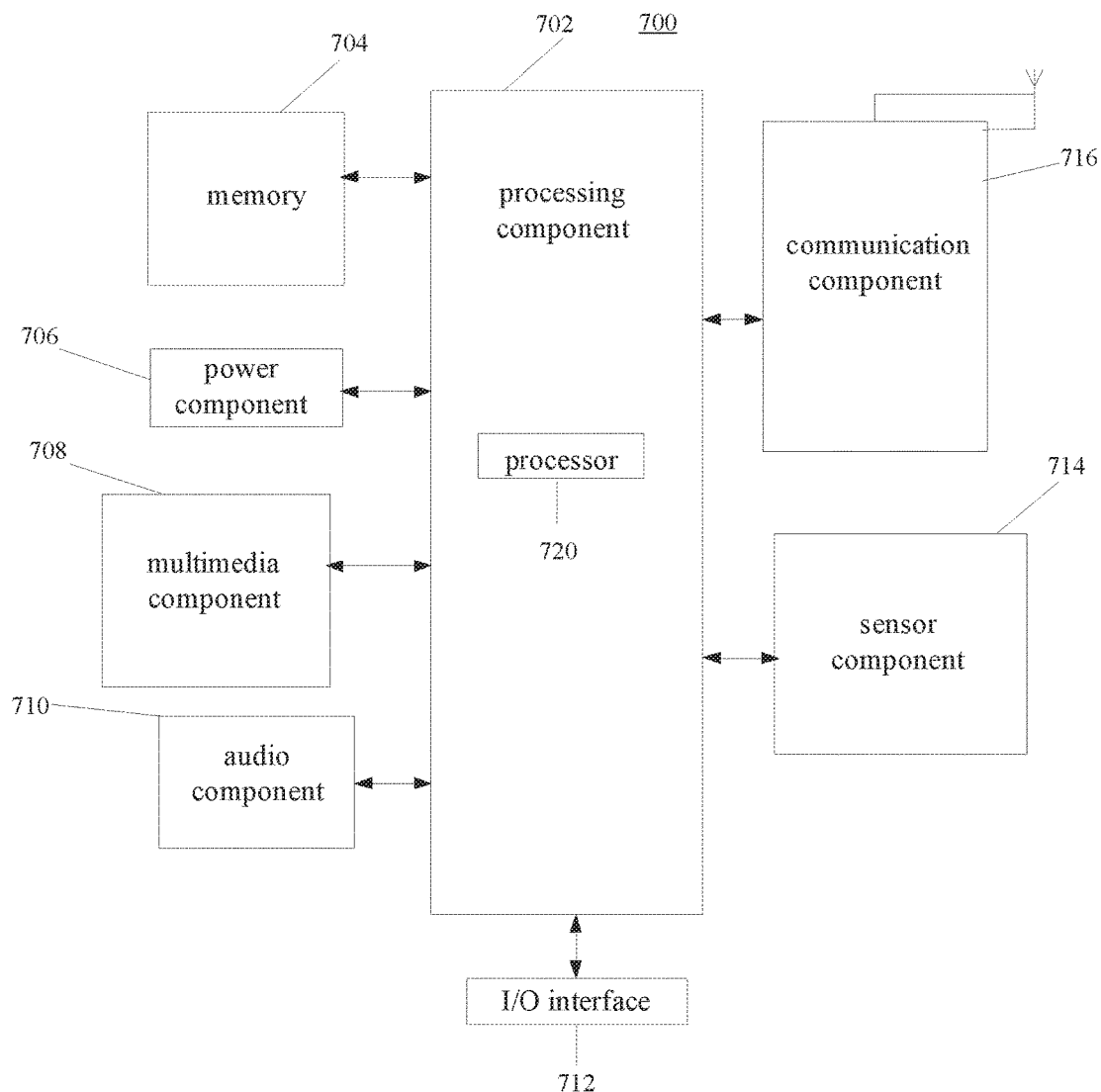
FIG. 7 is a block diagram showing a device for characteristic extraction according to another exemplary embodiment.

FIG. 7 is a block diagram of a device 700 for characteristic extraction according to an exemplary embodiment. The device 700 may be a mobile phone, a computer, a digital broadcast terminal, a messaging device, a gaming console, a tablet, a medical device, exercise equipment, a personal digital assistant, and the like.

As shown in FIG. 7, the device 700 includes one or more of the following components: a processing component 702, a memory 704, a power component 706, a multimedia component 708, an audio component 710, an input/output (I/O) interface 712, a sensor component 714, and a communication component 716.

The processing component 702 is configured to control overall operations of the device 700, such as the operations associated with display, telephone calls, data communications, camera operations, and recording operations. The processing component 702 includes one or more processors 720 configured to execute instructions to perform all or part of the steps of the disclosed methods. The processing component 702 may include one or more modules that facilitate the interaction between the processing component 702 and other components. For instance, the processing component 702 may include a multimedia module configured to facilitate the interaction between the multimedia component 708 and the processing component 702.

The memory 704 is configured to store various types of data to support the operation of the device 700. Examples of such data include instructions for any applications or methods operated by the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 is configured to provide power to various components of the device 700. The power component 706 may include a power management system, one or more power sources, and any other components associated with the generation, management, and distribution of power for the device 700.

The multimedia component 708 includes a screen providing an interface between the device 700 and the user. In some embodiments, the screen may include a liquid crystal display and a touch panel. If the screen includes the touch panel, the screen may be implemented as a touch screen configured to receive input signals from the user. The touch panel includes one or more touch sensors configured to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum when the device 700 is in an operation mode, such as a photographing mode or a video mode. Each of the front camera and the rear camera may be a fixed optical lens system or have optical focusing and zooming capability.

The audio component 710 is configured to output and/or input audio signals. For example, the audio component 710 includes a microphone configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker configured to output audio signals.

The I/O interface 712 provides an interface between the processing component 702 and peripheral interface modules, such as, for example, a keyboard, a click wheel, buttons, and the like. The buttons may include, but are not limited to, a home button, a volume button, a starting button, and a locking button.

The sensor component 714 includes one or more sensors configured to provide status assessments of various aspects of the device 700. For instance, the sensor component 714 may detect an open/closed status of the device 700, relative positioning of components (e.g., the display and the keypad, of the device 700), a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of a nearby object without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate wired or wireless communication between the device 700 and other devices. The device 700 can access a wireless network based on a communication standard, such as WiFi, 2G, 3G, or a combination thereof. In an exemplary embodiment, the communication component 716 is configured to receive a broadcast signal or broadcast associated information from an external broadcast management system via a broadcast channel. In an exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for characteristic extraction.

In exemplary embodiments, there is also provided a non-transitory computer-readable storage medium including instructions, such as instructions included in the memory 704, which are executable by the processor 720 included in the device 700, for performing the above-described methods for characteristic extraction. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the inventive concept is not limited to the exact construction that has been described above and illustrated in the accompanying drawings, and that various modifications and changes can be made without departing from the scope thereof. It is intended that the scope of the invention only be limited by the appended claims.

What is claimed is:

1. A computer-implemented method for image recognition, comprising:
   dividing an image into a plurality of blocks, each block including a plurality of cells;
   performing sparse signal decomposition for each cell to obtain a sparse vector corresponding to each cell; and
   extracting characteristics of Histogram of Oriented Gradient (HOG) of the image according to the sparse vectors,
   wherein performing sparse signal decomposition for each cell to obtain the sparse vector corresponding to each cell comprises:
      adjusting pixels of each cell to form an n*1 dimensional vector; and
      performing sparse signal decomposition on the vector for each cell using the following formula to obtain a corresponding sparse vector:

$\min(x)\|x\|_1$ subject to $y=Dx$;

wherein, y is the vector of each cell, D is a predefined over-inclusive dictionary, x is the sparse vector extracted by performing sparse decomposition on y using the over-inclusive dictionary D, and $\|x\|_1$ is the summation of absolute values of all rows in each column of the sparse vector x, wherein each sparse vector is an m*1 dimensional vector, and the over-inclusive dictionary D is an n*m matrix.

2. The method of claim 1, wherein extracting the characteristics of Histogram of Oriented Gradient (HOG) of the image according to the sparse vectors comprises:
   calculating a gradient magnitude and a gradient direction of each cell according to the sparse vector to extract a descriptor of each cell;
   extracting characteristics of HOG of each block based on statistics of respective descriptors of each block; and
   extracting characteristics of HOG of the image based on statistics of the characteristics of HOG of respective blocks of the image.

3. The method of claim 2, wherein extracting the characteristics of HOG of the image based on the statistics of the characteristics of HOG of respective blocks of the image comprises:
   cascading the characteristics of HOG of the respective blocks of the image to form a matrix to obtain the characteristics of HOG of the image, wherein each column of the matrix represents the characteristics of HOG of a block.

4. The method of claim 3, wherein the method comprises:
   normalizing the image to obtain an image with a predefined size.

5. The method of claim 2, wherein extracting the characteristics of HOG of the image based on statistics of the characteristics of HOG of respective blocks of the image comprises:
   adjusting the characteristics of HOG of each block in the image represented by an initial L*1 dimensional vector to form an M*N matrix, wherein each block comprises M*N pixels, and L=M*N; and
   extracting the characteristics of HOG of the image according to the adjusted characteristics of HOG of each block and a corresponding position of each block in the image.

6. The method of claim 5, wherein the method comprises:
   normalizing the image to obtain an image with a predefined size.

7. The method of claim 2, wherein the method comprises:
   normalizing the image to obtain an image with a predefined size.

8. The method of claim 1, wherein the method comprises:
   normalizing the image to obtain an image with a predefined size.

9. A device for image recognition, comprising:
   a processor; and
   a memory configured to store instructions executable by the processor,
   wherein the processor is configured to:
      divide an image into a plurality of blocks, each block including a plurality of cells;
      perform sparse signal decomposition for each cell to obtain a sparse vector corresponding to each cell; and
      extract characteristics of Histogram of Oriented Gradient (HOG) of the image according to the sparse vectors,
   wherein in performing sparse signal decomposition for each cell to obtain the sparse vector corresponding to each cell, the processor is further configured to:
      adjust pixels in each cell to form an n*1 dimensional vector; and
      perform sparse signal decomposition on the vector for each cell using the following formula to obtain a corresponding sparse vector:

$\min(x)\|x\|_1$ subject to $y=Dx$;

wherein, y is the vector of each cell, D is a predefined over-inclusive dictionary, x is the sparse vector extracted by performing sparse signal decomposition on y using the over-inclusive dictionary D, and $\|x\|_1$ is the summation of absolute values of all rows in each column of the sparse vector x, wherein each sparse vector is an m*1 dimensional vector, and the over-inclusive dictionary D is an n*m matrix.

10. The device of claim 9, wherein the processor is configured to:
    calculate a gradient magnitude and a gradient direction of each cell according to the sparse vector to extract a descriptor of each cell;
    extract characteristics of HOG of each block based on statistics of respective descriptors of each block; and extract characteristics of HOG of the image based on statistics of the characteristics of HOG of respective blocks of the image.

11. The device of claim 10, wherein the processor is configured to:

cascade the characteristics of HOG of the respective blocks of the image to form a matrix to obtain the characteristics of HOG of the image, wherein each column of the matrix represents the characteristics of HOG of a block.

12. The device of claim 11, wherein the processor is further configured to:

normalize the image to obtain an image with a predefined size.

13. The device of claim 10, wherein the processor is configured to:

adjust the characteristics of HOG of each block in the image represented by an initial L*1 dimensional vector to form an M*N matrix, wherein each block comprises M*N pixels, and L=M*N; and extract the characteristics of HOG of the image according to the adjusted characteristics of HOG of each block and a corresponding position of each block in the image.

14. The device of claim 10, wherein the processor is further configured to:

normalize the image to obtain an image with a predefined size.

15. The device of claim 9, wherein the processor is further configured to:

normalize the image to obtain an image with a predefined size.

16. A non-transitory computer-readable storage medium having instructions stored therein that, when executed by a processor of a computer device, cause the computer device to perform a method for image recognition, the method comprising:

dividing an image into a plurality of blocks, each block including a plurality of cells;

performing sparse signal decomposition for each cell to obtain a sparse vector corresponding to each cell; and extracting characteristics of Histogram of Oriented Gradient (HOG) of the image according to the sparse vectors, wherein the performing sparse signal decomposition for each cell to obtain a sparse vector corresponding to each cell comprises:

adjusting pixels of each cell to form an n*1 dimensional vector; and performing sparse signal decomposition on the vector for each cell using the following formula to obtain a corresponding sparse vector:

$$\min(x)\|x\|_1 \text{ subject to } y=Dx;$$

wherein, y is the vector of each cell, D is a predefined over-inclusive dictionary, x is the sparse vector extracted by performing sparse decomposition on y using the over-inclusive dictionary D, and $\|x\|_1$ is the summation of absolute values of all rows in each column of the sparse vector x, wherein each sparse vector is an m*1 dimensional vector, and the over-inclusive dictionary D is an n*m matrix.

* * * * *